(12) United States Patent
Chen et al.

(10) Patent No.: US 11,287,800 B2
(45) Date of Patent: Mar. 29, 2022

(54) METHOD FOR MONITORING MACHINE, DEVICE, AND STORAGE MEDIUM

(71) Applicant: FU DING ELECTRONICAL TECHNOLOGY (JIASHAN) CO., LTD., Jiashan (CN)

(72) Inventors: Lei Chen, Kunshan (CN); Jing Luo, Kunshan (CN); Hang Shen, Kunshan (CN); Yu-Xue Shi, Kunshan (CN)

(73) Assignee: FU DING ELECTRONICAL TECHNOLOGY (JIASHAN) CO., LTD., Jiashan (CN)

( * ) Notice: Subject to any disclaimer, the term of this patent is extended or adjusted under 35 U.S.C. 154(b) by 105 days.

(21) Appl. No.: 16/703,028

(22) Filed: Dec. 4, 2019

(65) Prior Publication Data

US 2021/0089001 A1  Mar. 25, 2021

(30) Foreign Application Priority Data

Sep. 23, 2019  (CN) .......................... 201910897259.3

(51) Int. Cl.
*G05B 19/4063* (2006.01)
*G05B 19/402* (2006.01)

(52) U.S. Cl.
CPC ....... *G05B 19/4063* (2013.01); *G05B 19/402* (2013.01); *G05B 2219/31437* (2013.01); *G05B 2219/37506* (2013.01); *G05B 2219/40228* (2013.01)

(58) Field of Classification Search
CPC .............. G05B 19/4063; G05B 19/402; G05B 2219/37506; G05B 2219/40228; G05B 2219/31437; G05B 2219/50193; G05B 2219/50185
See application file for complete search history.

(56) References Cited

U.S. PATENT DOCUMENTS

2013/0253871 A1\* 9/2013 Gray ........................ G01B 5/25
702/95
2019/0354915 A1\* 11/2019 Hockett ........... G05B 19/41875

\* cited by examiner

*Primary Examiner* — Christopher E. Everett
(74) *Attorney, Agent, or Firm* — ScienBiziP, P.C.

(57) ABSTRACT

A method for a device to monitor performance of a manufacturing machine which is equipped with a fixture for holding a workpiece, the fixture having at least one fixing hole, includes obtaining actual coordinate values of the fixing hole in a plurality of machining processes and calculating a standard deviation of the coordinates in at least one axial direction according to the actual coordinate values and a preset standard coordinate value. A risk index in at least one axial direction is calculated according to the standard deviation and a preset tolerance and a determination made as to whether risk index exceeds a preset threshold. A warning is sent to the machine and supervising engineer if the risk exceeds the preset threshold. A machine monitoring device and a computer readable storage medium are also provided.

16 Claims, 5 Drawing Sheets

| | C01719 | C01721 | C01723 | C01725 | C02755 | C03186 | C03189 | C03191 | C03192 | C03195 |
|---|---|---|---|---|---|---|---|---|---|---|
| Standard deviations of Y-axis positive direction | 0.023843 | 0.147125 | 0.023436 | 0.023961 | 0.012975 | 0.023752 | 0.03284 | 0.021906 | 0.025576 | 0.073313 |
| Standard deviations of Y-axis negative direction | 0.023577 | 0.149365 | 0.024634 | 0.026294 | 0.018428 | 0.027159 | 0.034074 | 0.023101 | 0.025484 | 0.07853 |
| Standard deviations of X-axis positive direction | 0.023597 | 0.040069 | 0.031956 | 0.029928 | 0.024578 | 0.069696 | 0.029607 | 0.027937 | 0.024148 | 0.037907 |
| Standard deviations of X-axis negative direction | 0.023268 | 0.06488 | 0.022613 | 0.030301 | 0.017885 | 0.062699 | 0.028303 | 0.020519 | 0.020742 | 0.034829 |
| Risk index in Y-axis | 0.000948 | 0.00593 | 0.000961 | 0.001005 | 0.000628 | 0.001018 | 0.001338 | 0.0009 | 0.001021 | 0.003037 |
| Risk index in X-axis | 0.000472 | 0.000801 | 0.000439 | 0.000599 | 0.000492 | 0.001394 | 0.000592 | 0.000559 | 0.000483 | 0.000758 |
| | 0.00142 | 0.006731 | 0.001401 | 0.001604 | 0.00112 | 0.002412 | 0.00193 | 0.001459 | 0.001504 | 0.003795 |

FIG. 4

| Standard | C01719 | C01721 | C01723 | C01725 | C02755 | C03186 | C03189 | C03191 | C03192 | C03195 |
|---|---|---|---|---|---|---|---|---|---|---|
| | -162.3 | -162.31 | -162.33 | -162.31 | -162.3 | -162.3 | 162.32 | -162.31 | -162.31 | -162.3 |
| Average | -162.322 | -162.3132 | -162.22951 | -162.3185 | -162.2655 | -162.2531 | -162.3358 | -162.3329 | -162.3158 | -162.2545 |
| Deviation from mean | -0.021987 | -0.003237 | 0.1004875 | -0.008462 | 0.03455 | 0.0468875 | -0.015838 | -0.022912 | -0.0058 | 0.045475 |

FIG. 5

METHOD FOR MONITORING MACHINE, DEVICE, AND STORAGE MEDIUM

FIELD

The disclosure generally relates to a method for monitoring machine, device, and computer readable storage medium.

BACKGROUND

A CNC machine must perform stably and repetitively in a manufacturing situation. The CNC machine is usually evaluated by measuring the size and other characteristics of the products processed by the CNC machine. Current methods of evaluating the CNC machine may not be optimal.

BRIEF DESCRIPTION OF THE DRAWINGS

Implementations of the present technology will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The connection can be such that the objects are permanently connected or releasably connected. The term "comprising" means "including, but not necessarily limited to", it specifically indicates open-ended inclusion or membership in a so-described combination, group, series, and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer memory.

Figure 1:
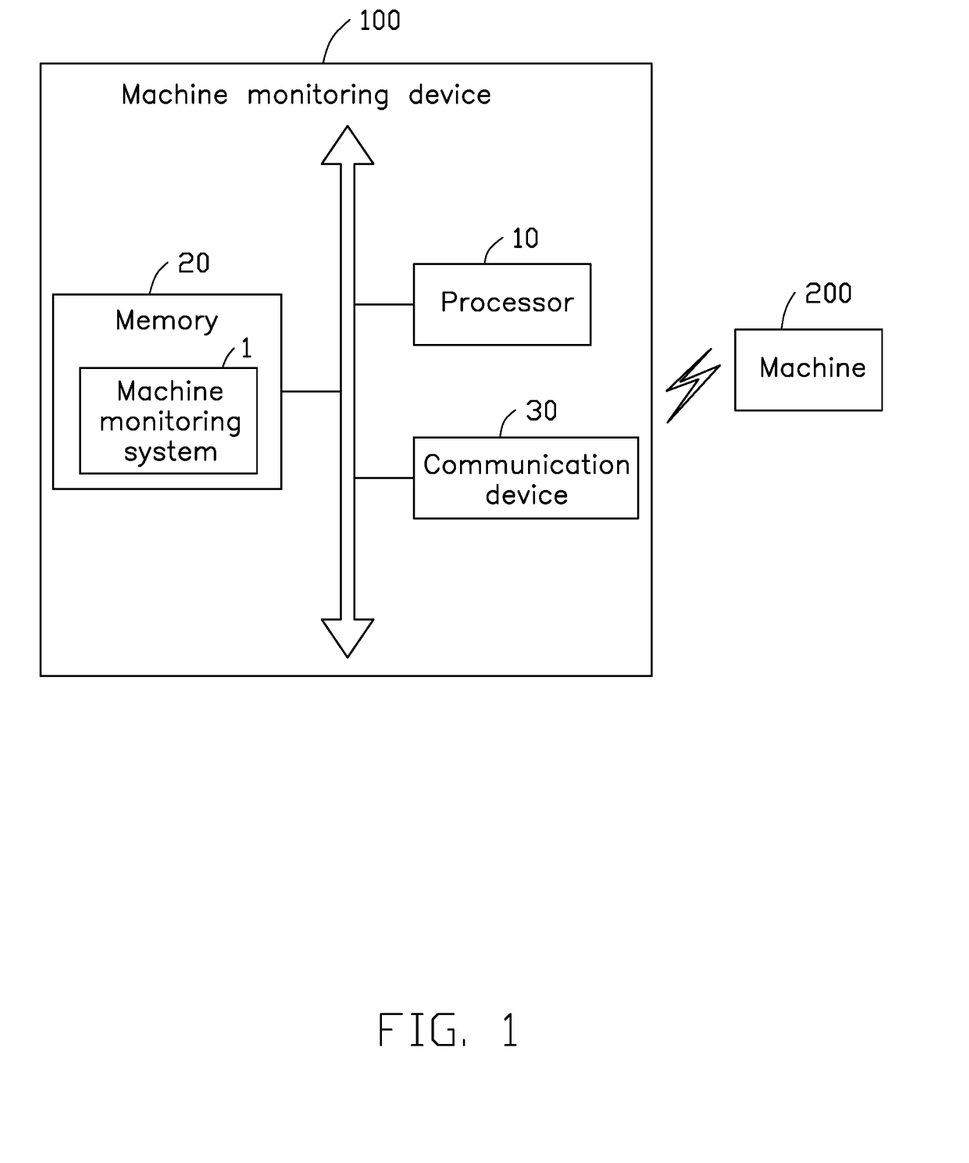
FIG. 1 is a block diagram of an embodiment of a device for monitoring a machine.

FIG. 1 illustrates an embodiment of a health-monitoring device (machine monitoring device 100). The machine monitoring device 100 includes a processor 10, a memory 20, and a communication device 30. The memory 20 and the communication device 30 are electrically connected to the processor 10.

A machine monitoring system 1 is stored in the memory 20 and executed by the processor 10 to function as disclosed. The machine monitoring system 1 is preferably a computer program. When the processor 10 executes the computer program, the steps in the embodiment of a method for the monitoring machine, as shown in FIG. 3, are implemented. Alternatively, the processor 10 can implement the functions of the modules in the embodiment of the machine monitoring system 1 (shown in FIG. 2) when the computer program is executed, such as the modules 101-107 in FIG. 2.

The machine monitoring device 100 can have a wired or wireless connection with at least one manufacturing machine (machine 200), so that health of the machine 200 can be monitored in real time. It can be understood by those skilled in the art that the schematic diagram is only an example of the machine monitoring device 100, and does not constitute a limitation on the machine monitoring device 100, other examples may include more or less components than those illustrated, or have different combination of some components, or different components. The machine monitoring device 100 may also include a network access device (not shown), a communication bus (not shown), and the like.

Since the health of each machine is not only related to the machine itself but also its performance, a fixture for positioning a workpiece to undergo processing is also relevant. Machine 200 described below is a machine with such fixture. The fixture has at least one fixing hole.

The first processor 10 may be a central processing unit (CPU), or may be other general-purpose processors, a digital signal processor (DSP), an application specific integrated circuit (ASIC), a Field-Programmable Gate Array (FPGA), or other programmable logic device, discrete gate or transistor logic device, discrete hardware components, or the like. The first processor 10 may be a microprocessor or other processor known in the art.

The memory 20 can be used to store the computer program and/or modules/units by running or executing computer programs and/or modules/units stored in the memory 20. The memory 20 may include a storage program area and a storage data area. In addition, the memory 20 may include a random access memory, a non-volatile memory such as a hard disk, a plug-in hard disk, a smart memory card (SMC), and a secure digital (SD) card, flash card, at least one disk memory, flash device, or other volatile solid state memory.

The communication device 30 can wirelessly communicate with the machine 200. The machine 200 can be a computer numerical control machine, such as FANUC, BROTHER, or ML series machines.

It can be understood that the machine monitoring device 100 is an industrial Internet platform-based device, and may be an industrial computer local to the machine 200, or can be a cloud server.

Figure 2:
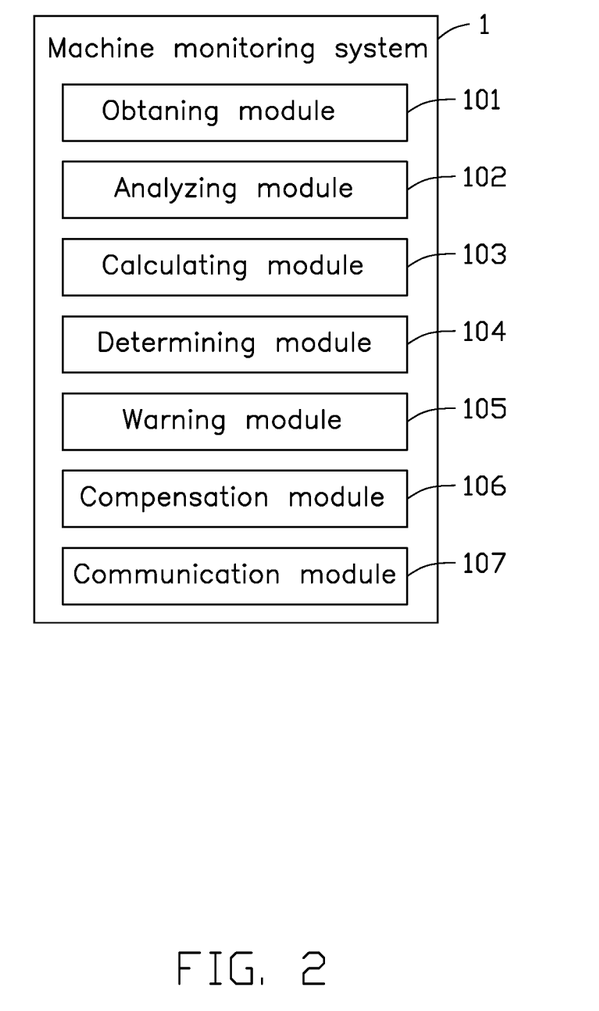
FIG. 2 is a block diagram of an embodiment of a machine monitoring system.
Figure 3:
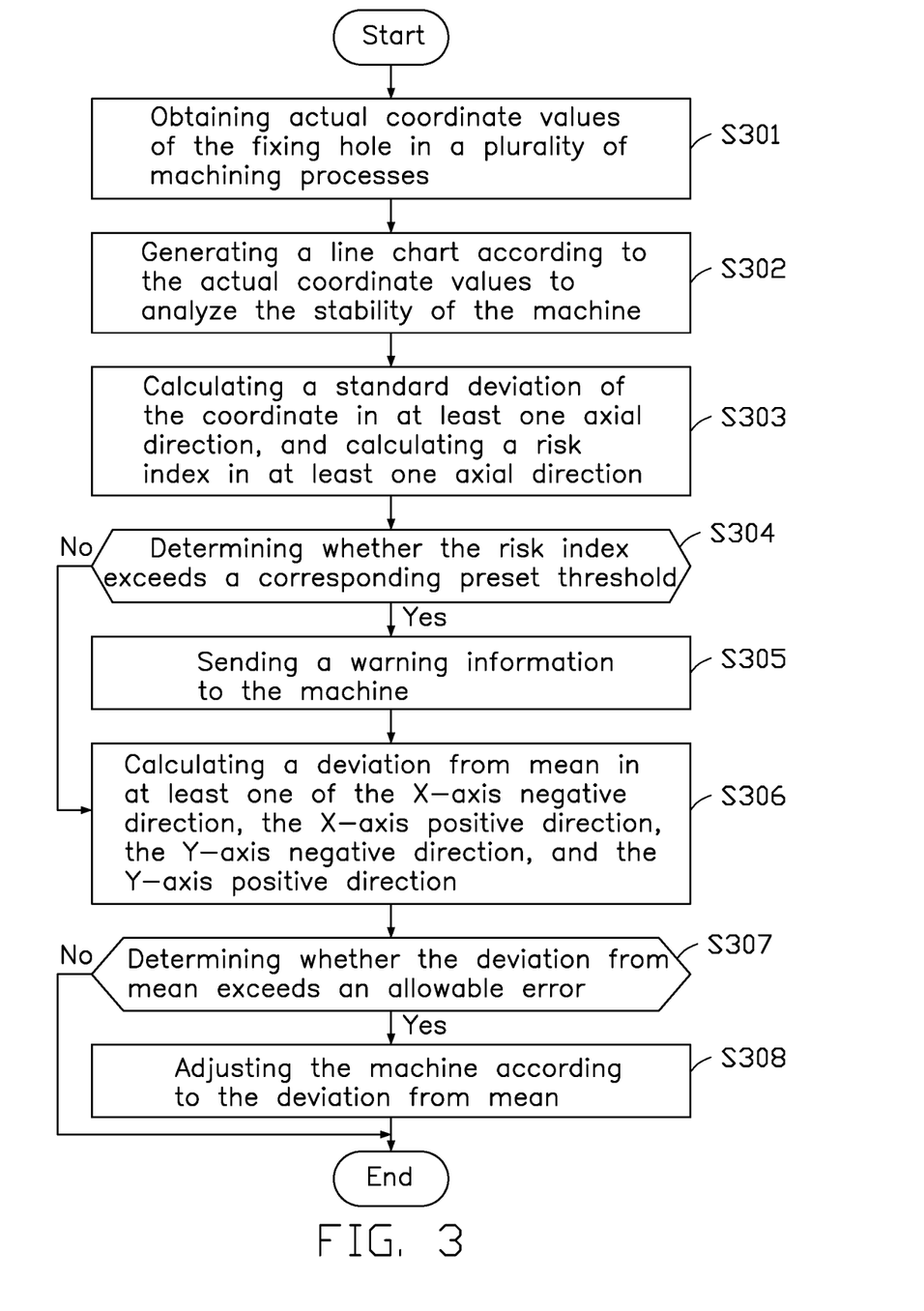
FIG. 3 is a flow chart of an embodiment of a method for monitoring the machine.

FIG. 2 shows the machine monitoring system 1 running in the machine monitoring device 100. The machine monitoring system 1 can include an obtaining module 101, an analysis module 102, a calculating module 103, a judgment module 104, a warning module 105, a compensation module 106, and a communication module 107. In other embodiments, the above module may also be a program instruction or firmware that is installed in the processor 10.

In one embodiment, the machine 200 is equipped with a fixture for fixing and holding a product to be processed, and the fixture has at least one fixing hole. The obtaining module 101 obtain actual coordinate values of at least of the fixing holes in processing.

The analysis module 102 generates a line chart according the plurality of actual coordinate values during processing.

The calculating module 103 calculates a standard deviation of the coordinate of the fixing hole in at least one axial direction and a risk index, and the calculating module 103 further calculates a deviation from mean of the coordinate in at least one direction.

The judgment module 104 determines whether the risk index exceeds a preset threshold.

The warning module 105 sends a warning to the machine 200 when the risk index exceeds a preset threshold.

The compensation module 106 writes a mean value deviation into the corresponding machine 200 to correct the machine.

The communication module 107 transmits the machine log and the warning to a computer and a mobile APP of the supervising engineer.

A method for a device to monitor a machine is illustrated in FIG. 3. The method is provided by way of embodiments, as there are a variety of ways to carry out the method. Each block shown in FIG. 3 represents one or more processes, methods, or subroutines carried out in the example method. Additionally, the illustrated order of blocks is by example only and the order of the blocks can be changed. The method can begin at block S301.

At block S301, actual coordinate values of at least one fixing hole in each of a plurality of machining processes is obtained.

In one embodiment, the machine 200 is equipped with a fixture for fixing and holding a product to be processed, and the fixture has at least one fixing hole. A standard coordinate value of each fixing hole is measured before processing by using a high-precision measuring instrument such as a three-dimensional measuring instrument, and the standard coordinate value is stored in the memory 20. The coordinate value is a distance from the fixing hole to an edge of the fixture.

The actual coordinate values of one fixing hole includes coordinate values in at least two directions. The directions includes an X-direction and a Y-direction. The X-direction includes two directions, that is, an X-axis positive direction and an X-axis negative direction. The Y-direction includes two directions, that is, an Y-axis positive direction and an Y-axis negative direction.

The actual coordinate values of a fixing hole includes distances from the fixing hole to reference edges of the fixture in the X-axis positive direction, the X-axis negative direction, the Y-axis positive direction, and the Y-axis negative direction. There can be multiple reference edges in each direction. For example, the fixture can include one reference edge in X the positive direction, one reference edge in the X-axis negative direction, two reference edges in the Y-axis positive direction, and two reference edges in the Y-axis negative direction. Therefore, the coordinate values of the fixing hole includes one coordinate value in the X-axis positive direction, one coordinate value in the X negative-position, two coordinate values in the Y-axis positive direction, and two coordinate values in the Y-axis negative direction.

The actual coordinate values of the fixing hole are detected and collected by a probe of the machine 200, and the data is sent to the machine monitoring device 100 by the machine 200.

It can be understood that the more actual coordinate values are collected, the more accurate will be the determination of the health of the machine 200. Preferably, the obtaining module 101 can obtain the actual coordinate values of the fixing holes during 80 to 120 times of processing.

At block S302, a line chart according to the actual coordinate values is generated to analyze the machine 200.

The analysis module 102 generates the line chart according the plurality of actual coordinate values during processing.

In one embodiment, the line chart is generated according to the actual coordinate values of the fixing hole of each machine 200 in one direction.

Preferably, the actual coordinate values of fixing holes of a plurality of machines 200 can be presented on the same line chart. Therefore, a machine 200 which is not healthy or is offset in some way can be visually obvious from the line chart.

In other embodiments, the process at block S302 can be omitted.

In other embodiments, the line chart can be sent to the machine 200 or other electronic device which is in communication with the machine monitoring device 1 for analysis by a supervising engineer.

At block S303, a standard deviation of the coordinates in at least one axial direction is calculated based on the actual coordinate values and a preset standard value. A risk index in at least one axial direction is calculated according to the standard deviation and a preset tolerance.

The calculation module 103 calculates the standard deviation of the coordinate of the fixing hole in at least one axial direction and the risk index.

The standard deviation includes a first value in a positive direction and a second value in a negative direction. The standard deviation of the X-direction includes a standard deviation in the X-axis positive direction and a standard deviation in the X-axis negative direction. The standard deviation of Y-direction includes a standard deviation in the Y-axis positive direction and a standard deviation in the Y-axis negative direction The risk index is the comprehensive risk index of the X-axis positive direction and the X-axis negative direction, or the comprehensive risk index of the Y-axis positive direction and the Y-axis negative direction. The risk index of the X axial is the product of the X-axis coordinate matrix and the tolerance matrix in X-axis, and the risk index of the Y-axis is the product of the Y-axis coordinate matrix and the tolerance matrix in Y-axis.

Since the accuracy requirements for processing different products can be different for the same machine and fixture, the risk index of this disclosure associates and combines the health of the machine with one processed product. The tolerances can be preset according to the requirements of the product. Each tolerance can be equal or unequal.

In one embodiment, the formula for the risk index is as follows:

X-axis risk index=$[X^-,X^+]*[G^{X-},G^{X+}]^T$.
Y-axis risk index=$[Y^-,Y^+]*[G^{Y-},G^{Y+}]^T$.

$X^-$, $X^+$, $Y^-$, and $Y^+$ are the standard deviations of X-axis negative direction, X-axis positive direction, Y-axis negative direction, and Y-axis positive direction respectively. $G^{X-}$, $G^{X+}$ $G^{Y-}$, and $G^{Y+}$ are the tolerances of X-axis negative direction, X-axis positive direction, Y-axis negative direction, and Y-axis positive direction respectively.

The risk index reflects the health score of the machine 200, the higher the risk index, the worse is the health or performance of the machine 200.

Figure 4:
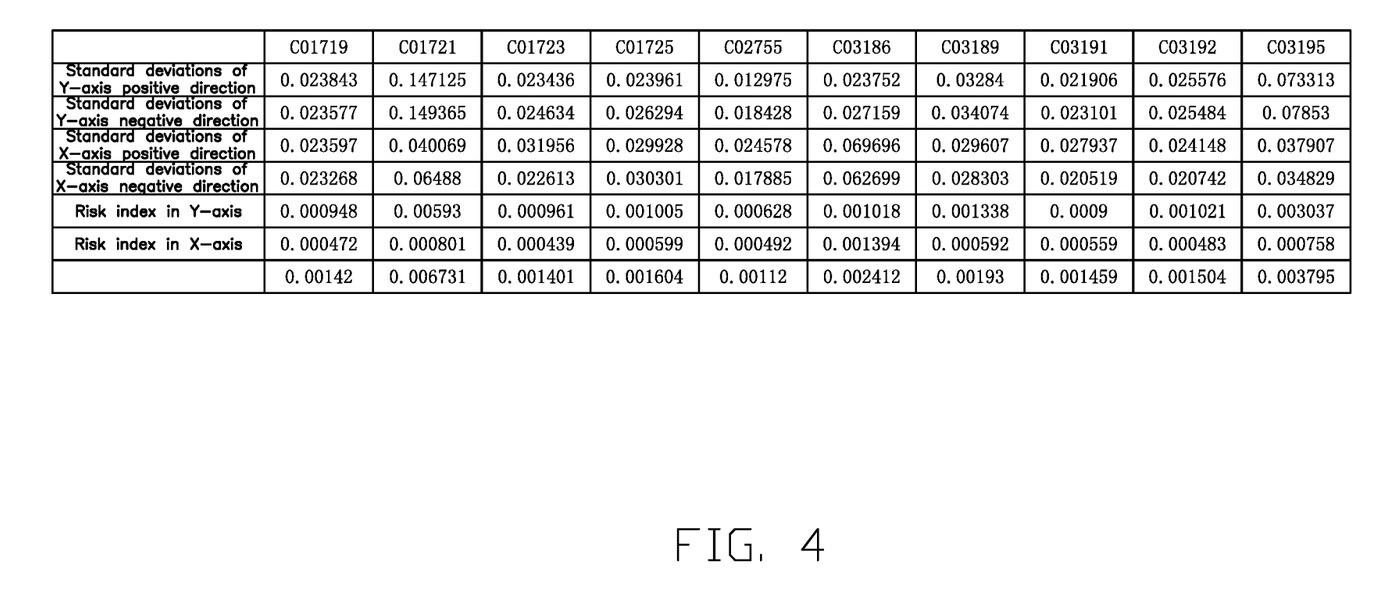
FIG. 4 is a table showing an embodiment of risk indexes of X-direction and Y-direction.

FIG. 4 is a table showing an embodiment of risk indexes of the X-direction and the Y-direction. In this embodiment, the tolerance is 0.02 mm.

Taking the machine C01721 as an example, the standard deviation of the fixing hole in the Y-axis positive direction is 0.147215, the standard deviation in the Y-axis negative direction is 0.14965, the standard deviation in the X-axis positive direction is 0.040069, and the standard deviation in the X-axis negative direction is 0.06488. According to the above standard deviations, the tolerance and the above formula after calculation, the risk index of the fixing hole in the Y-direction is 0.00593, and the risk index of the fixing hole index in the X-axis is 0.000801.

As shown in FIG. 4, the risk indexes in the Y-direction of the machines C01721 and C03195 are relatively large, and the risk index in the X-direction of the machine C03186 is relatively large.

At block S304, it is determined whether the risk index exceeds a preset threshold.

The determining module 104 determines whether the risk index exceeds the preset threshold.

For example, in the embodiment shown in FIG. 4, the threshold value of the X-axis risk index is 0.001, and the threshold value of the Y-axis risk index is 0.003. The determining module 104 determines that the X-axis risk index of the machine C03186 exceeds the preset threshold, the Y-axis risk index of the machines C01721 and C03195 exceeds the preset threshold, but other machines have normal parameters.

If any one risk index of axis exceeds the preset value, the process proceeds to block S305. If none of the preset thresholds is exceeded, the health of the machine 200 is determined to be good, and the process proceeds to block S306.

At block S305, a warning is sent to the machine 200.

The warning module 105 sends the warning to the machine 200, indicating that the health of the X-axis or the Y-axis of the machine 200 is abnormal. The warning can be sent through the TCP/IP protocol.

At block S306, a deviation from mean in at least one of the X-axis negative direction, the X-axis positive direction, the Y-axis negative direction, and the Y-axis positive direction is calculated according to the plurality of actual coordinate values.

The calculating module 103 calculates the deviation from mean in at least one of the X-axis negative direction, the X-axis positive direction, the Y-axis negative direction, and the Y-axis positive direction. The deviation from mean is a value of deviation between the average value of the coordinate values and a standard value during multiple processings.

At block S307, it is determined whether the deviation from mean exceeds an allowable error.

The determining module 104 determines whether the mean value deviation exceeds the allowable error. If YES, the process proceeds to block S308, and if NO, the process ends.

Figure 5:
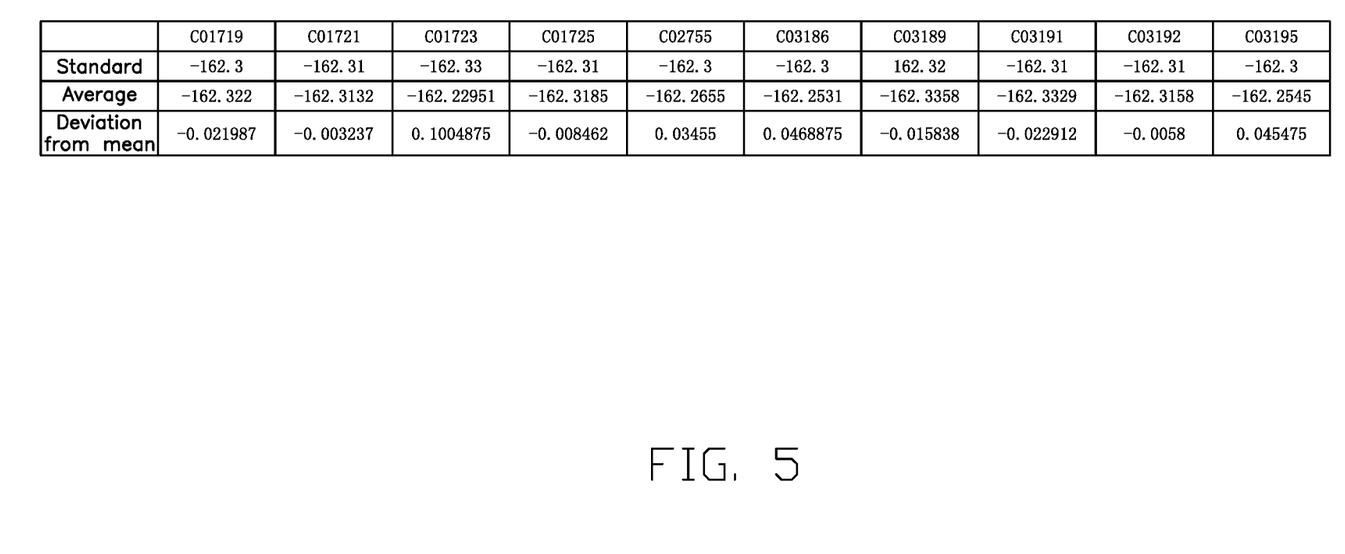
FIG. 5 is a table showing and analyzing standard deviation of a mean of the X-axis negative direction in one embodiment.

FIG. 5 shows a table analyzing the mean value deviation of the X-axis negative direction of one embodiment. The allowable error is 0.02. Taking the machine C01719 as an example, the standard value of the fixing hole in the X-axis negative direction is −162.3, and the actual average value is −162.322, thereby the mean value deviation of the fixing hole in the X-axis negative direction is −0.021987.

It can be seen from FIG. 5 that the mean value deviations of the X-axis negative directions of the machines C01719, C01723, C02755, C03186, C03191, and C03195 exceed the allowable error.

At block S308, adjusting the machine according to the deviation from mean.

In one embodiment, the deviation from mean is remotely written into the machine for correction.

The compensation module 106 remotely writes the mean value deviation into the corresponding machine 200 to correct the machine 200, thereby the compensation module 106 can dynamically compensate for the deviation of the machine 200.

For example, in the embodiment shown in FIG. 5, the compensation module 106 writes the mean value deviation −0.021987 as compensation into the machine C01719.

In an embodiment, the correction of the machine can be verified by a Complex Process Capability Index (CPK).

In the embodiment shown in FIG. 5, before the correction, the CPK values of the machines C01719, C01723, C02755, C03186, C03191, C03195 in the X-axis negative direction are all less than zero. After the correction, the CPK of each machine is greater than zero, indicating effective compensation.

In other embodiments, the method further includes the following step.

The communication module 107 transmits the machine log and the warning to a computer and a mobile APP of the supervising engineer.

In other embodiments, the processes of blocks S302, S306-S308 can be omitted.

The machine monitoring device 100, method, and computer readable storage medium are capable of acquiring actual coordinate values of at least one of the fixing holes in a plurality of machining processes; calculating a standard deviation of the coordinate in at least one axial direction according to the actual coordinate values and a preset standard coordinate value, and calculating a risk index in at least one axial direction according to the standard deviation and a preset tolerance; determining whether the risk index exceeds a preset threshold; and sending a warning to the machine if the risk exceeds the preset threshold. Therefore, the present disclosure enables the monitoring of the health of the machine in real time, improves the stability and repeatability of the machine processing, and improves the efficiency of the machine, avoiding batch defective products and reducing production costs.

The machine monitoring device 100, method, and computer readable storage medium are further capable of calculating a deviation from mean in at least one of the X-axis negative direction, the X-axis positive direction, the Y-axis negative direction, and the Y-axis positive direction according to the plurality of actual coordinate values; determining whether the deviation from mean exceeds an allowable error; and adjusting the machine according to the deviation from mean when the deviation from mean exceeds the allowable error. Therefore, dynamic compensation can be applied against the deviation of the machine.

A person skilled in the art can understand that all or part of the processes in the above embodiments can be implemented by a computer program to instruct related hardware, and that the program can be stored in a computer readable storage medium. When the program is executed, a flow of steps of the methods as described above may be included.

In addition, each functional device in each embodiment may be integrated in one processor, or each device may exist physically separately, or two or more devices may be integrated in one device. The above integrated device can be implemented in the form of hardware or in the form of hardware plus software function modules.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method for monitoring health of at least one machine, the method being applicable in a health-monitoring device that establishes a communication connection with at least one machine which is equipped with a fixture for fixing a product, and the fixture defining at least one fixing hole, the method comprising:

obtaining actual coordinate values of the at least one fixing hole in a plurality of machining processes;

calculating a standard deviation of the actual coordinate values in at least one direction according to the actual coordinate values and a preset standard coordinate value, and calculating a risk index in the at least one direction according to the standard deviation and a preset tolerance, the at least one direction comprising an X-direction and a Y-direction, the standard deviation of the X-direction comprising a standard deviation in an X-axis positive direction and a standard deviation in an X-axis negative direction, the standard deviation of the Y-direction comprising a standard deviation in a Y-axis positive direction and a standard deviation in a Y-axis negative direction, wherein the risk index in an X-axis is calculate by $[X^-, X^+]*[G^{X-}, G^{X+}]^T$, and the risk index in a Y-axis is calculate by $[Y^-, Y^+]*[G^{Y-}, G^{Y+}]^T$, $X^-$, $X^+$, $Y^-$, and $Y^+$ are the standard deviations of the X-axis negative direction, the X-axis positive direction, the Y-axis negative direction, and the Y-axis positive direction, respectively; and $G^{X-}$, $G^{X+}$, $G^{Y-}$, and $G^{Y+}$ are a tolerances of the X-axis negative direction, the X-axis positive direction, the Y-axis negative direction, and the Y-axis positive direction, respectively, wherein the risk index reflects a health score of the at least one machine, the higher the risk index, the worse is the health or performance of the at least one machine;

determining whether the risk index exceeds a preset threshold; and sending a warning to the machine if the risk exceeds the preset threshold.

2. The method of claim 1, wherein the actual coordinate values comprises distances from the at least one fixing hole to corresponding reference edges of the fixture in the X-axis positive direction, the X-axis negative direction, the Y-axis positive direction, and the Y-axis negative direction.

3. The method of claim 1, wherein the fixture comprises one or more reference edges in each one of the X-axis positive direction, the X-axis negative direction, the Y-axis positive direction, and the Y-axis negative direction.

4. The method of claim 1, wherein when the risk index does not exceed a corresponding preset threshold, the method further comprising:

calculating a deviation from mean in at least one of the X-axis negative direction, the X-axis positive direction, the Y-axis negative direction, and the Y-axis positive direction according to the plurality of actual coordinate values;

determining whether the deviation from mean exceeds an allowable error;

adjusting the machine according to the deviation from mean when the deviation from mean exceeds the allowable error.

5. The method of claim 1, after obtaining actual coordinate values of the at least one fixing hole in a plurality of machining processes, the method further comprises:

generating a line chart according to the actual coordinate values to analyze the stability of the machine.

6. The method of claim 1, wherein the actual coordinate values of the at least one fixing hole is detected by a probe, and the standard coordinate value is measured before processing by using a high-precision measuring instrument.

7. A machine monitoring device, comprising:

a communication unit communicating with at least one machine quipped with a fixture for fixing a product, the fixture having at least one fixing hole;

at least one processor; and at least one memory storing one or more programs, when executed by the at least one processor, the one or more programs cause the at least one processor to:

obtain actual coordinate values of the at least one fixing hole in a plurality of machining processes;

calculate a standard deviation of the actual coordinate values in at least one direction according to the actual coordinate values and a preset standard coordinate value, and calculate a risk index in the at least one direction according to the standard deviation and a preset tolerance, the at least one direction comprising a X-direction and a Y-direction, the standard deviation of the X-direction comprising a standard deviation in an X-axis positive direction and a standard deviation in a X-axis negative direction, the standard deviation of Y-direction comprising a standard deviation in a Y-axis positive direction and a standard deviation in a Y-axis negative direction, wherein the risk index in an X-axis is calculate by $[X^-, X^+]*[G^{X-}, G^{X+}]^T$, and the risk index in a Y-axis is calculate by $[Y^-, Y^+]*[G^{Y-}, G^{Y+}]^T$, $X^-$, $X^+$, $Y^-$, and $Y^+$ are the standard deviations of the X-axis negative direction, the X-axis positive direction, the Y-axis negative direction, and the Y-axis positive direction, respectively; and $G^{X-}$, $G^{X+}$, $G^{Y-}$, and $G^{Y+}$ are a tolerances of the X-axis negative direction, the X-axis positive direction, the Y-axis negative direction, and the Y-axis positive direction, respectively, wherein the risk index reflects a health score of the at least one machine, the higher the risk index, the worse is the health or performance of the at least one machine;

determine whether the risk index exceeds a preset threshold; and send a warning to the machine if the risk exceeds the preset threshold.

8. The machine monitoring device of claim 7, the actual coordinate values comprises distances from the at least one fixing hole to corresponding reference edges of the fixture in the X-axis positive direction, the X-axis negative direction, the Y-axis positive direction, and the Y-axis negative direction.

9. The machine monitoring device of claim 7, wherein the fixture comprises one or more reference edges in each one of the X-axis positive direction, the X-axis negative direction, the Y-axis positive direction, and the Y-axis negative direction.

10. The machine monitoring device of claim 7, wherein when the risk index does not exceed a corresponding preset threshold, the one or more programs further cause the at least one processor to:
   calculate a deviation from mean in at least one of the X-axis negative direction, the X-axis positive direction, the Y-axis negative direction, and the Y-axis positive direction according to the plurality of actual coordinate values;
   determine whether the deviation from mean exceeds an allowable error;
   adjust the machine according to the deviation from mean when the deviation from mean exceeds the allowable error.

11. The machine monitoring device of claim 7, wherein after obtaining actual coordinate values of the at least one fixing hole in a plurality of machining processes, the one or more programs further cause the at least one processor to:
   generate a line chart according to the actual coordinate values to analyze the stability of the machine.

12. The machine monitoring device of claim 7, wherein the actual coordinate values of the at least one fixing hole is detected by a probe, and the standard coordinate value is measured before processing by using a high-precision measuring instrument.

13. A computer readable storage medium having stored thereon instructions that, when executed by at least one processor of a computing device, causes the processor to perform a defect detecting method, the method comprising:
   obtaining actual coordinate values of a fixing hole in a plurality of machining processes;
   calculating a standard deviation of the actual coordinate values in at least one axial direction according to the actual coordinate values and a preset standard coordinate value, and calculating a risk index the in at least one axial direction according to the standard deviation and a preset tolerance, the at least one direction comprising a X-direction and a Y-direction, the standard deviation of the X-direction comprising a standard deviation in a X-axis positive direction and a standard deviation in a X-axis negative direction, the standard deviation of Y-direction comprising a standard deviation in a Y-axis positive direction and a standard deviation in a Y-axis negative direction, wherein the risk index in an X-axis is calculate by $[X^-,X^+]*[G^{X-},G^{X+}]^T$, and the risk index in a Y-axis is calculate by $[Y^-,Y^+]*[G^{Y-},G^{Y+}]^T$, $X^-$, $X^+$, $Y^-$, and $Y^+$ are the standard deviations of the X-axis negative direction, the X-axis positive direction, the Y-axis negative direction, and the Y-axis positive direction, respectively; and $G^{X-}$, $G^{X+}$, $G^{Y-}$, and $G^{Y+}$ are a tolerances of the X-axis negative direction, the X-axis positive direction, the Y-axis negative direction, and the Y-axis positive direction, respectively, wherein the risk index reflects a health score of the at least one machine, the higher the risk index, the worse is the health or performance of the at least one machine;
   determining whether the risk index exceeds a corresponding preset threshold;
   sending a warning to the machine if the risk exceeds the preset threshold.

14. The computer readable storage medium of claim 13, wherein the actual coordinate values comprises distances from the fixing hole to corresponding reference edges of the fixture in the X-axis positive direction, the X-axis negative direction, the Y-axis positive direction, and the Y-axis negative direction.

15. The computer readable storage medium of claim 13, wherein when the risk index does not exceed a corresponding preset threshold, the method further comprising:
   calculating a deviation from mean in at least one of the X-axis negative direction, the X-axis positive direction, the Y-axis negative direction, and the Y-axis positive direction according to the plurality of actual coordinate values;
   determining whether the deviation from mean exceeds an allowable error;
   adjusting the machine according to the deviation from mean when the deviation from mean exceeds the allowable error.

16. The computer readable storage medium of claim 13, after obtaining actual coordinate values of the fixing hole in a plurality of machining processes, the method further comprises:
   generating a line chart according to the actual coordinate values to analyze the stability of the machine.

* * * * *